(12) United States Patent
Pancurák et al.

(10) Patent No.: US 8,926,804 B2
(45) Date of Patent: Jan. 6, 2015

(54) CONTAINER FOR ACTIVATION OF DRINKABLE LIQUIDS

(76) Inventors: František Pancurák, Prešov (SK); Ladislav Jurec, Prešov (SK)

(*) Notice: Subject to any disclaimer, the term of this patent is extended or adjusted under 35 U.S.C. 154(b) by 140 days.

(21) Appl. No.: 13/207,601

(22) Filed: Aug. 11, 2011

(65) Prior Publication Data

US 2013/0026031 A1  Jan. 31, 2013

(30) Foreign Application Priority Data

Aug. 11, 2010 (SK) ........................................ 86-2010

(51) Int. Cl.
*C02F 1/46* (2006.01)
*C02F 1/461* (2006.01)
*C02F 1/00* (2006.01)

(52) U.S. Cl.
CPC ....... *C02F 1/46176* (2013.01); *C02F 2301/024* (2013.01); *C02F 1/46109* (2013.01); *C02F 2001/46123* (2013.01); *C02F 1/005* (2013.01)
USPC ............................ 204/248; 204/271; 205/745

(58) Field of Classification Search
CPC ............... C02F 1/4618; C02F 1/46176; C02F 1/46104; C02F 1/46109; C02F 2001/46123; C02F 2001/46152; C25B 11/02; C25B 9/125
USPC .......... 204/271, 212, 248, 289, 669; 205/745, 205/758
See application file for complete search history.

(56) References Cited

U.S. PATENT DOCUMENTS

| | | |
|---|---|---|
| 540,608 A | 6/1895 | Collier et al. |
| 547,710 A | 10/1895 | Cassard |
| 866,618 A | 9/1907 | Brannon |
| 2,424,145 A | 7/1947 | Butler |
| 2,451,067 A | 10/1948 | Butler |
| 2,548,584 A | 4/1951 | Briggs |
| 2,670,327 A | 2/1954 | Rader |
| 2,754,260 A | 7/1956 | Butler |
| 2,930,568 A | 3/1960 | Rader |
| 2,974,747 A | 3/1961 | Coolidge, Jr. et al. |
| 3,026,259 A | 3/1962 | Phillips |
| 3,286,922 A | 11/1966 | Franz |
| 3,392,102 A | 7/1968 | Koch |
| 3,728,245 A | 4/1973 | Preis et al. |
| 3,974,071 A | 8/1976 | Dunn et al. |
| 4,126,544 A | 11/1978 | Baensch et al. |
| 4,749,457 A | 6/1988 | Yasuda et al. |
| 4,769,120 A * | 9/1988 | Chak .............................. 204/269 |
| 4,886,593 A * | 12/1989 | Gibbs ............................ 204/667 |

(Continued)

FOREIGN PATENT DOCUMENTS

UA  61 317  12/2002
WO  WO 2010023712 A1 *  3/2010  ............. C02F 1/461

*Primary Examiner* — Harry D Wilkins, III
*Assistant Examiner* — Ciel Thomas
(74) *Attorney, Agent, or Firm* — Greer, Burns & Crain, Ltd.

(57) ABSTRACT

A fluid container with an output of drinkable activated and vitalized fluids, preferably activated and vitalized water, preferably for fluid intake, includes a hollow body with an opening for filling fitted with a connector connecting an openable cap. An outlet for the bottle is provided for dispensing the fluid. The outlet is fitted with a galvanic processing device for galvanic fluid treatment of the fluid and to produce a swirling motion of the fluid.

20 Claims, 8 Drawing Sheets

(56) References Cited

U.S. PATENT DOCUMENTS

| | | | |
|---|---|---|---|
| 5,250,177 A * | 10/1993 | Cho | 210/192 |
| 5,695,644 A | 12/1997 | Buchanan et al. | |
| 5,814,227 A | 9/1998 | Pavlis | |
| 6,264,837 B1 | 7/2001 | Marsden | |
| 6,524,475 B1 * | 2/2003 | Herrington et al. | 210/192 |
| 6,605,212 B2 | 8/2003 | Marsden | |
| 6,663,783 B2 | 12/2003 | Stephenson et al. | |
| 6,689,270 B1 | 2/2004 | Evert | |
| 7,084,548 B1 | 8/2006 | Gabrys | |
| 2001/0020598 A1 | 9/2001 | Marsden | |
| 2002/0036172 A1 | 3/2002 | Del Signore | |
| 2006/0102492 A1 | 5/2006 | Corradi et al. | |
| 2007/0048199 A1 | 3/2007 | Lee | |
| 2009/0038961 A1 | 2/2009 | Denton et al. | |
| 2009/0166368 A1 * | 7/2009 | Regan et al. | 220/739 |
| 2011/0180397 A1 * | 7/2011 | Hayakawa et al. | 204/248 |

* cited by examiner

CONTAINER FOR ACTIVATION OF DRINKABLE LIQUIDS

FIELD OF THE INVENTION

The invention relates to a container for fluids with an output of drinkable activated and vitalized fluids, preferably activated and vitalized water, such as for human water intake, which contains a galvanic processing device for fluids, preferably water.

BACKGROUND OF THE INVENTION

Nowadays, healthcare is heavily promoted. One of the more studied and promoted segments of healthcare is fluid intake because failure to maintain fluid intake results in a wide range of disorders. There are tendencies and applications based on introducing fluid intake at the lowest levels of school education. Fluid intake typically takes the form of 0.3 to 0.7 liter disposable packages of juice or mineral water. A major disadvantage of such a solution is that beverages in PET bottles are expensive, up to 40% of the price total being constituted by the PET bottle itself, which ends up in the waste stream and landfills.

There are also tendencies to use vending machines with packaged beverages, the main disadvantage being that they only offer beverages that produce the highest profit. Another disadvantage of this solution is that individuals are encouraged to drink products with high sugar or energy content. However, these solutions prevent people who cannot afford to buy packaged beverages from following recommended or needed fluid intake. These groups of people include hikers, sportsmen, travelers, etc. It is mainly these target groups and their fluid intake that this invention is aimed at because the antibacterial bottle can be easily carried. The bottle is made of polypropylene enriched with silver nanoparticles. The bottle includes two parts, namely a cylindrical body and a cap with a stopper at the top that slides into prefabricated grooves.

The stated effect of the antibacterial bottle manifests itself mainly through the fact that fluids contained in the bottle do not go bad quickly.

Experimental studies have shown that galvanically treated water has positive effects on a person's health as well. This galvanically treated water has only been utilized industrially so far to protect water pipe systems and equipment from scale. The solution that is currently in use for galvanic water treatment is called Ion Scale-Buster. The device is connected to the cold water source of an auxiliary condenser by means of a ferrule. Inside the device, there is a high-grade zinc anode and a serially connected whirling block made of plastic material. Zinc and brass are two different noble metals. When they come into contact with water, the electric voltage potential difference between them increases up to about 1 Volt, which practically turns the device into a galvanic cell that continually releases fractional amounts of zinc into the water flow. Zinc facilitates the agglomeration of substances present in water, such as calcium.

The device for galvanic water treatment as such is sufficiently described in international patent application No. WO 94/170000 or French file No. FR 2 222 560. One of the disadvantages of this system is its relative length, which renders it inapplicable outside industrial use. Another disadvantage of the device is the high hydraulic resistance that it creates in the water flow, so the device is only applicable industrially where artesian water is available.

The generation of turbulences and vortices in a moving liquid to result in a change in the bioenergetic properties of the liquid was studied and discussed by Viktor Schauberger and is described in several books and internet sites, including "Living Water"—Viktor Schauberger and the Secrets of Natural Energy by Olof Alexandersson (1976) and http://www.pks.or.at/menu_en.html. Viktor Schauberger described the effect caused by turbulences and vortices to be a "vitalizing" effect, which term is used herein.

It would be an advantage in the art if there were provided galvanically treated fluids especially for maintaining fluid intake as well as specially-designed bottles and containers for this purpose. It would also be an advantage to provide galvanic fluid treatment, such as for drinking water, as late as in the phase of releasing the fluid from the container.

SUMMARY OF THE INVENTION

The disadvantages and shortcomings in the art described above can be eliminated by constructing a fluid container with an output of drinkable activated and vitalized fluids, preferably activated and vitalized water, preferably for human fluid intake, according to this invention. The essence of the invention lies in the use of galvanic effects in combination with a controlled water flow between the galvanic cells, whereby the flow is released in whirling motion from a simple device generally fitted onto fluid containers.

The fluid container with an output of drinkable activated and vitalized fluids, preferably activated and vitalized water, preferably for fluid intake, includes a hollow body with an opening, preferably wide, for filling. In an embodiment of the invention, the body is typically cylindrical, although it can also be spherical, cuboid, cubic or asymmetrical, e.g. pear-shaped. Typically in the area of the wide opening for filling, the body, representing a substantial part of the fluid container, is fitted with a removable or liftable cap terminating in a finish configuration or outlet. The connection between the body and the cap is made via a connector. The finish or outlet of the container may be fitted with a galvanic processing device for galvanic fluid treatment.

If the container with an output of drinkable activated and vitalized fluids is a bottle having two parts, the finish of the cap may be fitted with one of many conventional finish options available.

Similarly, there are several conventional solutions for the connector that connects the hollow body with the cap. It can be a combination of a rounded, e.g. pressed, thread around the edge of the hollow body opening and a thread around the edge of the cap, optionally fitted with a gasket. Alternatively, the connector may comprise a sealed cap slid into the hollow body based on two different diameters of the cap fitting and the complementary body fitting (or vice versa). To secure this connection, various clips can be used, which can also serve an aesthetic function. The galvanic processing device for galvanic fluid treatment can be pressed or sealed tightly into the bottle or cap; alternatively, the galvanic processing device can be placed in a tapered seat with a locking arrangement.

A similar construction can be made use of in a carafe-shaped fluid container with an output of drinkable activated and vitalized fluids.

If the fluid container with an output of drinkable activated and vitalized fluids is a conventional tap container, i.e. it includes a hollow body and a lifting cap fitted with an air pump, then the galvanic processing device for galvanic fluid treatment can also be provided at the outlet. The outlet may be a curved tube extending through a wall of the container, in which case the galvanizing processing device for galvanic fluid treatment can be fitted at the intake opening of this tube or at its outlet.

The fluid container with an output of drinkable activated and vitalized fluids, preferably activated and vitalized water, preferably for fluid intake, can also be constructed as a thermally insulated bottle, a thermally insulated flask, a thermally insulated tap flask, provided with thermally insulated individual parts. A particular construction for a galvanic processing device for galvanic fluid treatment is disclosed and claimed in a co-pending application, U.S. Ser. No. 13/207,579, and which is incorporated herein in its entirety by reference, but to make the description of this invention complete, several features of the galvanic processing device will be emphasized. The galvanic processing device for galvanic fluid treatment thus includes a flow unit with an inlet opening and an outlet opening combined with a set of two different electrodes. Electrodes which may be used in the present device are more particularly described in co-pending patent application Ser. No. 13/207,573, and which is incorporated herein in its entirety by reference. The flow unit is hollow and made of non-conductive, dielectric material advantageously made of plastic. The flow unit houses two types of electrodes which function as the anodes and cathodes of a galvanic cell. The electrodes are made of two different conductive materials, e.g. copper—zinc, brass—zinc, stainless steel—zinc, copper—aluminum, brass—aluminum, carbon—zinc, etc., and they have the shape of segmentally cut disks around the circumference, whereby the edges of the individual segments, in one embodiment, are bent at an angle $\alpha$ in one direction or the other. The bended edges of the individual segments of both types of electrodes results in counterclockwise or clockwise (levorotatory or dextrorotatory) water flows, depending on the orientation of the disks. The electrodes are separated by spacers which are made of a non-conductive, dielectric material. In one embodiment, the disks are all oriented in a similar manner such that the fluid will spiral through the disks either clockwise or counterclockwise. In another embodiment, half of the disks are oriented in one way and the other half of the disks are oriented in a reverse position so that the angle of the edges of the individual segments is negative $\alpha$. This will cause the fluid to spiral first in one direction, and then in an opposite direction when passing through the galvanic processing device. In another embodiment, the segments of all disks are shaped the same way, displaying an angle $\alpha$ in the center and an angle $\beta$ at the periphery of the disk. This causes the fluid to spiral in one direction at the center of the flow and in another direction at the periphery of the flow.

The advantages of the fluid container with an output of drinkable activated and vitalized fluids, preferably activated and vitalized water, preferably for fluid intake, according to this invention are obvious from the effects that the invention manifests externally. The effects of this invention include particularly the fact that the hollow body of the container is filled with common fluids, such as water, tea, plain or flavored mineral water, etc., through an opening for filling, and once the cap is replaced it is possible to pour or measure out an activated and vitalized fluid from the container due to the galvanizing process effected by the integrated galvanic processing device which creates the effect of fluid polarization resulting in activated and vitalized fluids. Activated and vitalized fluids have better bio-energetic and information properties: first of all, it is the hydrogen exponent balance and the pH quantity. Further properties include the informative quantities of specific electric conductivity measured in $\mu S$, the total concentration of electrically neutral soluble ingredients measured in mg/l, and the oxidation reduction potential measured in mV.

The effects of this invention also include that a product has been designed which can be of major significance in promoting the maintenance of fluid intake in all classes of population, because the container can be designed as a two-part bottle that is easy to assemble, which is particularly suitable for students, hikers, travelers, etc. The container can be designed as a two-part carafe that is easy to assemble, which is suitable for stationary use in households, workplaces, etc. The container can also be designed as a tap container or thermally insulated bottle with a conventional air pump fitted with a galvanic processing device for galvanic fluid treatment, which can be applied to the outlet tube. This type of a tap container or thermally insulated bottle can be used advantageously by the elderly, ill people, people working in extreme conditions, etc. The types of containers described above and their suggested use have one property in common—each of them is an individual's personal need, that is to say every person has their own fluid container and if it is designed to hold 2.5 liters of fluid, it represents one person's daily fluid intake. This way everyone can easily check their daily fluid intake. For example, it is possible to design a 0.7 liter container for water, which should be sufficient for pupils and students with approximately four 4-hour refilling cycles. This would provide a young person with a sufficient amount of fluid between 7 a.m. and 11 p.m. This system of fluid intake is also advantageous because the types of fluids can vary in the course of the four cycles, so that, for example, tea is used in the first cycle, mineral water in the second cycle, flavored mineral water in the third, and again tea in the final cycle. A person in an administrative position can take advantage of a 1.5 liter carafe, which should be sufficient for the whole duration of a work shift. This kind of person can then resume their fluid intake maintenance at home with a second 0.7 to 1.5 liter carafe. The elderly or ill might prefer to take advantage of a single 2 liter tap container or thermally insulated bottle.

Another advantage of the container designed according to an embodiment of this invention is easy filling due to the wide opening for filling, in addition to the fact that the hollow body of the container can be easily sealed.

Having a wide opening for filling also ensures that the container can be thoroughly cleaned.

Another advantage of the container is that the galvanic processing device for galvanic fluid treatment can be replaced easily, be it the hollow body or a cap with an integrated galvanic processing device for galvanic fluid treatment.

BRIEF DESCRIPTION OF THE DRAWINGS

The container for common fluids with an output of drinkable activated and vitalized fluids, preferably activated and vitalized water, preferably for water intake, according to this invention will be elucidated using drawings.

DETAILED DESCRIPTION OF THE INVENTION

It is understood that the individual applications and embodiments of the fluid container with an output of drinkable activated and vitalized fluids, preferably activated and vitalized water, preferably for water intake, according to this invention are given here only for illustration purposes; they do not present the limitations of all technical solutions. Persons of ordinary skill in the art capable of routine experimentation will be able to find further equivalents of the specific applications of the invention described here.

Persons of ordinary skill in the art will not have difficulty dimensioning this kind of fluid container with an output of drinkable activated and vitalized fluids, preferably activated and vitalized water, preferably for water intake, or choosing suitable materials and construction designs, which is why these properties have not been described here in detail.

Figure 1:
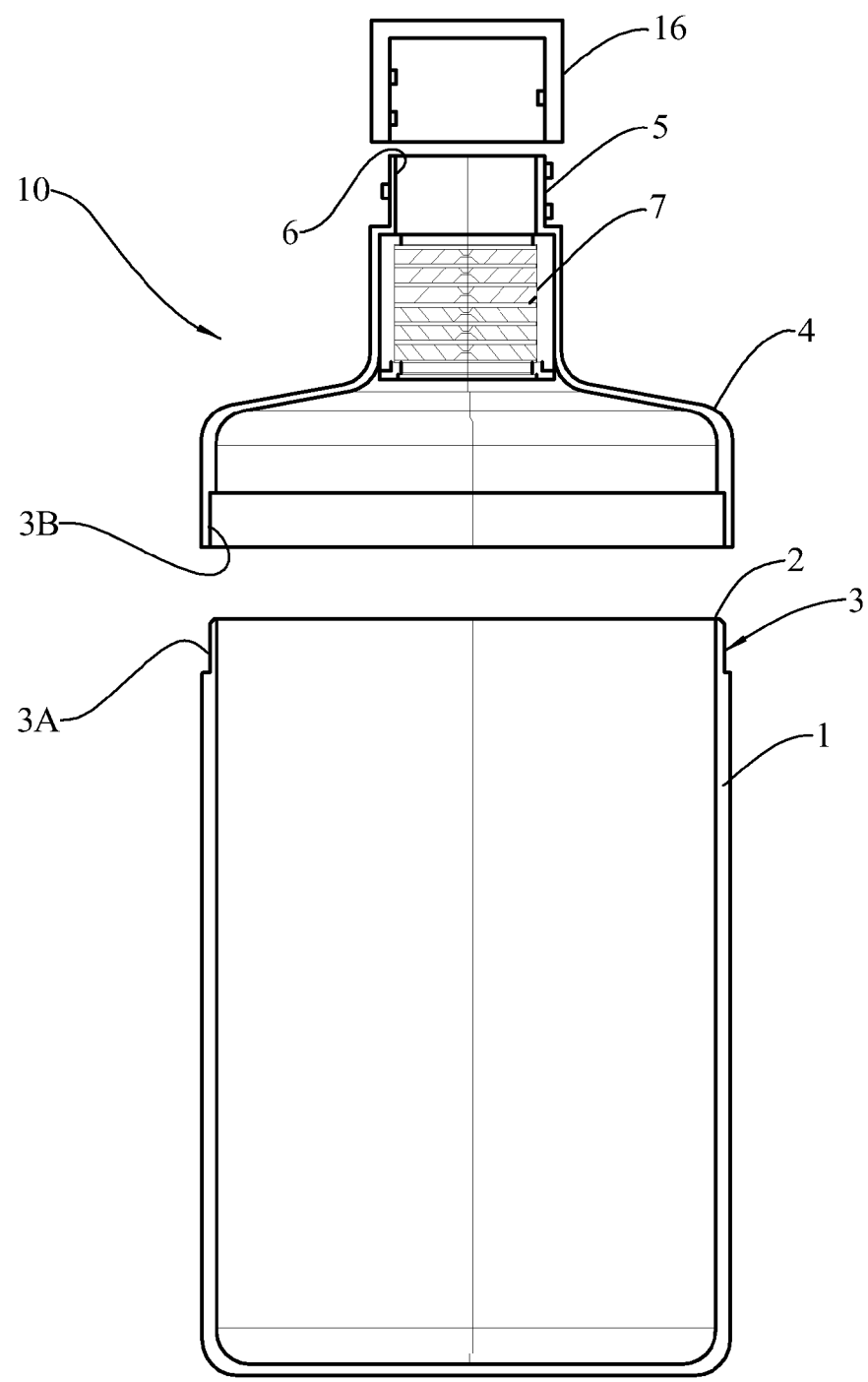
FIG. 1 shows a side sectional view of a fluid container embodying the principles of the present invention in the form of a bottle.

A first embodiment of the invention provides a student's bottle 10 as a fluid container with an output of drinkable activated and vitalized fluids, preferably activated and vitalized water, preferably for water intake, according to this invention, as shown in FIG. 1. The bottle 10 includes a plastic cylindrical hollow body 1 with a wide opening 2 for filling, for example, with a volume of 1.5 liter. The top part of the wide opening 2 is fitted with a cap 4 with a finish configuration 5. The finish 5 of the cap 4 may be, for instance, equipped with a threaded stopper 16. A connector 3 connecting the hollow body 1 with the cap 4 is sliding and includes a fitting 3A on the hollow body 1 and a complementary fitting 3B on the cap 4. Alternatively, the connection between the hollow body 1 and the cap 4 can be made by means of a rounded, pressed thread, which is not shown in the figure (but is similar to the thread provided for the stopper 6). The finish 5 is fitted with a galvanic processing device 7 for galvanic fluid treatment.

Figure 3:
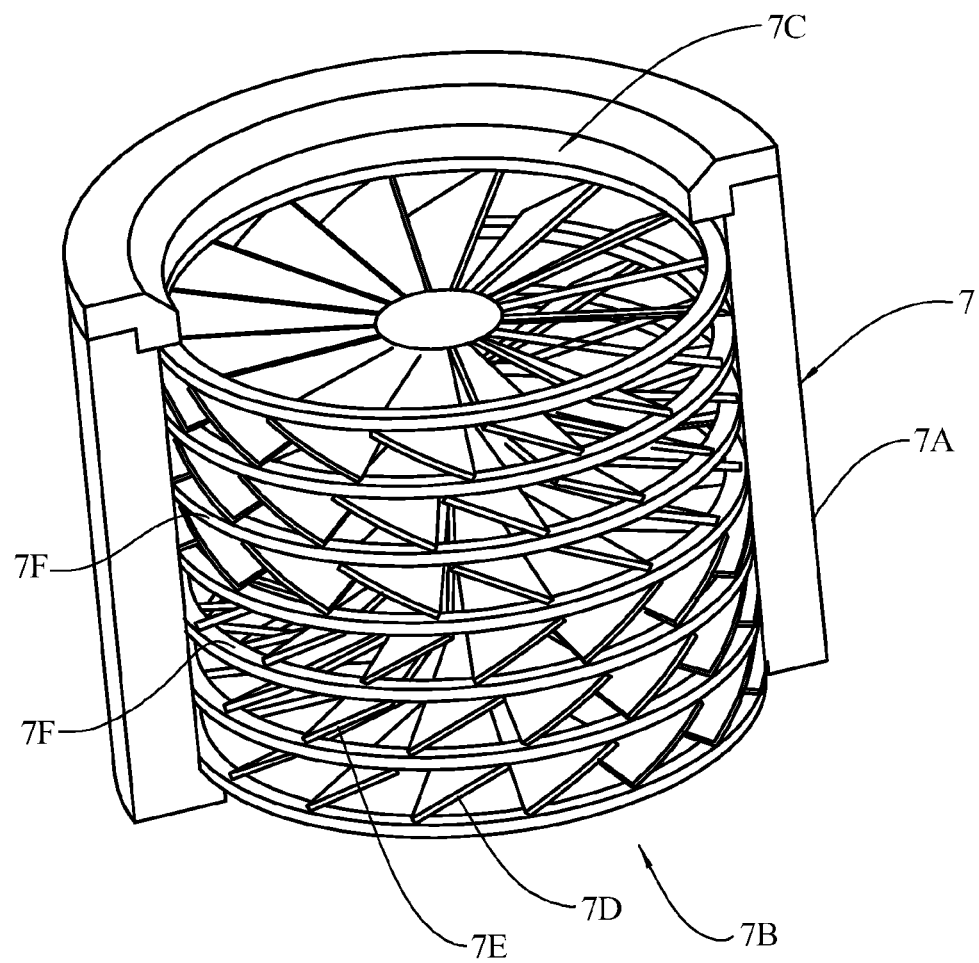
FIG. 3 shows a side elevational view, cut-away, of the galvanic processing device for galvanic fluid treatment which may be in one of three different arrangements.
Figure 8:
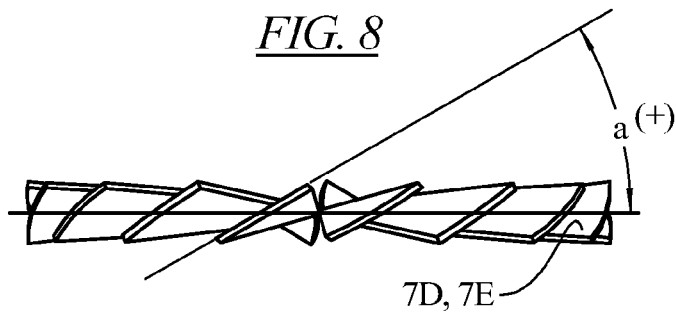
FIG. 8 shows a side elevational view of an electrode in a first orientation.
Figure 9:
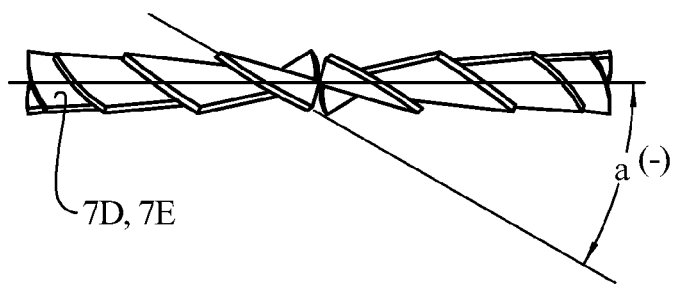
FIG. 9 shows a side elevational view of an electrode in a second orientation.
Figure 10:
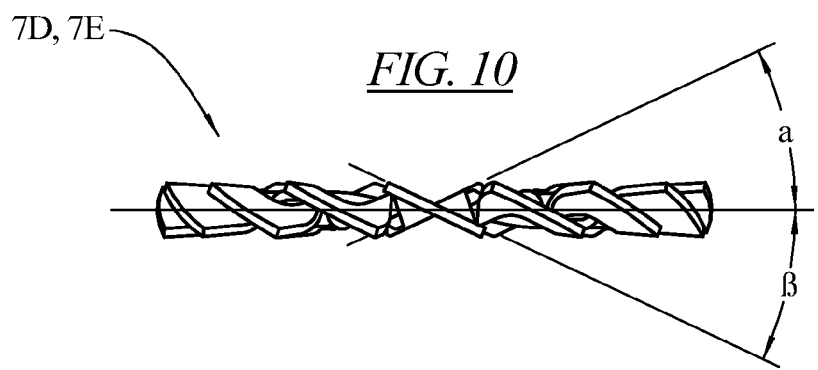
FIG. 10 shows a side elevational view of a second embodiment of an electrode.

This galvanic processing device 7, shown in greater detail in FIG. 3, includes a flow unit 7A with an inlet opening 7B and an outlet opening 7C combined with a special set of two different electrodes 7D, 7E which function as the anodes and cathodes of a galvanic cell. The electrodes 7D, 7E are made of two different conductive materials, e.g. copper—zinc, brass—zinc, stainless steel—zinc, copper—aluminum, brass—aluminum, carbon—zinc, etc., and they have the shape of segmentally cut disks around the circumference, whereby the edges of the individual segments in one embodiment are bent at an angle $\alpha$ in the range of 15-75° in one direction as shown in FIG. 8. This will cause the fluid flowing through the galvanic processing device 7 to spiral either clockwise or counterclockwise, depending on the orientation of angle $\alpha$. In another embodiment, some, such as half, of the electrodes 7D, 7E are oriented in one direction with the edges of the segments are positioned at angle $\alpha$ while other electrodes, such as the other half, are oriented in an opposite direction (flipped over) (FIG. 9) so that the edges of the segments are positioned at angle negative $\alpha$. This will cause the fluid flowing through the galvanic processing device 7 to spiral first in one direction and then in the other direction when passing through the galvanic processing device. In still another embodiment (FIG. 10) the segments of all disks are shaped the same way, having an angle $\alpha$ in the range of 15 to 75° at an intermediate portion of the disk and at an angle $\beta$, in the range of 15 to 75° in either the same or opposite direction as angle $\alpha$, at the periphery. This causes the fluid to spiral in one direction at the center of the flow and in another direction at the periphery. The bended edges of the individual segments of both types of electrodes 7D, 7E may result in either levorotatory or dextrorotatory water flows, as discussed. The electrodes 7D, 7E are separated by spacers 7F which are made of a non-conductive, dielectric material. The flow unit 7A is hollow and made of non-conductive, dielectric material, advantageously made of plastic. The galvanic processing device 7 for galvanic fluid treatment can be firmly pressed into the finish 5 of the cap 4. The student's bottle 10 can be fashioned with a variety of special-purpose or aesthetic surface finishes.

Figure 2:
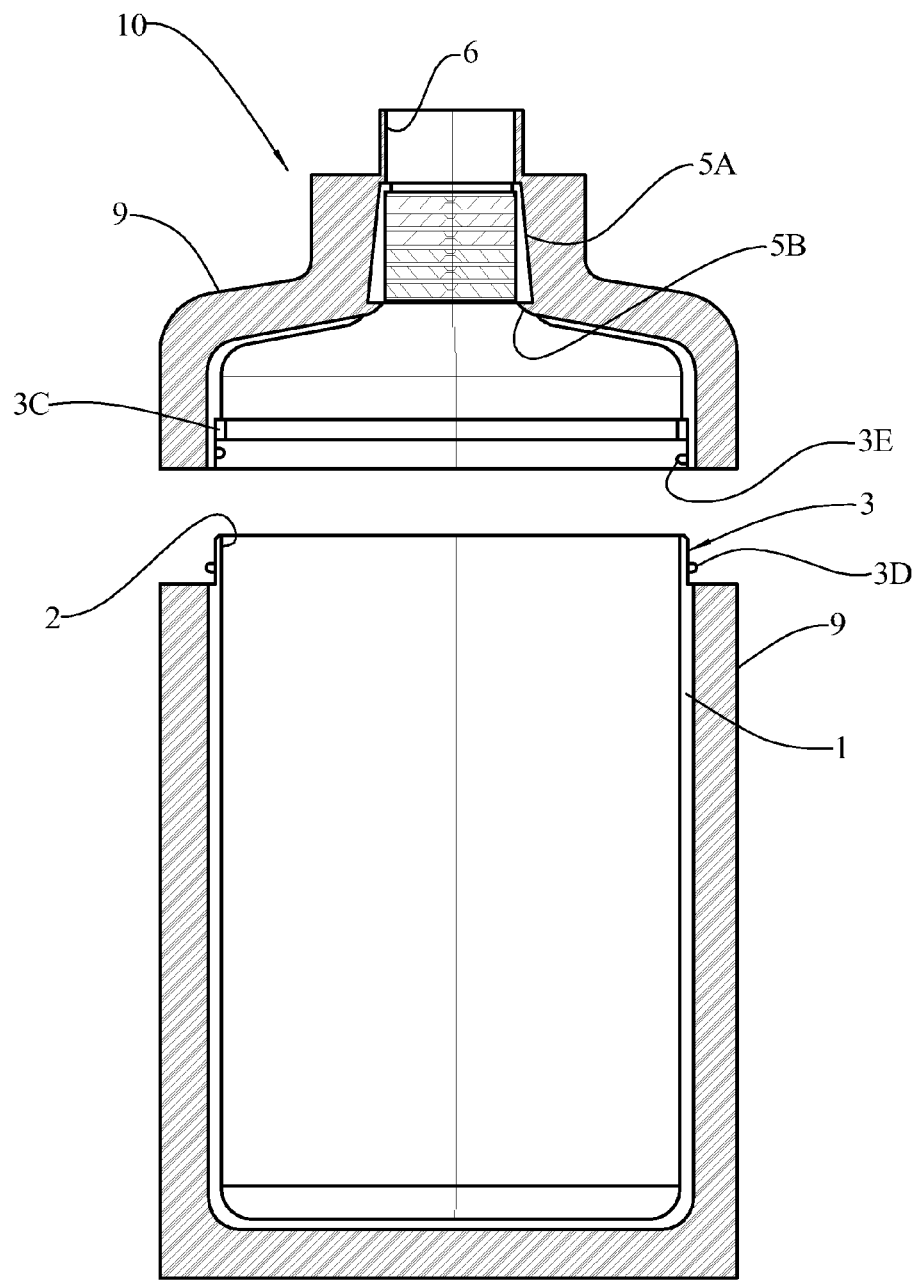
FIG. 2 shows a side sectional view of a second embodiment of a fluid container embodying the principles of the present invention.

In a second embodiment of the container, a hiker's bottle 10 is provided as a fluid container with an output of drinkable activated and vitalized fluids, preferably activated and vitalized water, preferably for water intake, according to this invention, as shown in detail in FIG. 2. There are optionally differences in the cross-section of the oval hollow body 1, e.g. a kidney-shaped container with a volume of 0.7 liter. In this case, the connector 3 is sliding with a gasket 3C and a locking arrangement, e.g. two clips 3D, 3E. The surface finish of the bottle 10 can be leathered and fitted with a snap-hook.

In a third embodiment, a traveler's bottle 10 is provided as a fluid container with an output of drinkable activated and vitalized fluids, preferably activated and vitalized water, preferably for water intake, according to this invention, as already shown in detail in FIG. 2. There are optional differences in the cross-section of the oval hollow body 1, e.g. a rectangle with rounded edges with a volume of 0.7 liter, and the material it is made of, e.g. stainless steel. In this case, the connector 3 is sliding with a gasket 3C and locking arrangement, e.g. two clips 3D, 3E. The surface finish of the bottle 10 can include an antireflection coating.

The galvanic processing device 7 for galvanic fluid treatment can be located in the finish 5 of the bottle 1, removably placed in a tapered seat 5A with a locking arrangement 5B.

In a fourth embodiment, a bottle is provided with thermal insulation 9 (FIG. 2) as a fluid container with an output of drinkable activated and vitalized fluids, preferably activated and vitalized water, preferably for water intake, according to this invention. A difference as compared to the first embodiment is that the body 1 and the cap 4 are equipped with thermal insulation 9.

In a fifth embodiment, a carafe is provided as a fluid container with an output of drinkable activated and vitalized fluids, preferably activated and vitalized water, preferably for water intake, according to this invention, as already shown in detail in FIG. 2. The differences, for example, include the shape of the body 1 and the cap 4, e.g. pear-shaped, and a volume of 2.4 liter. In this case, the connector 3 is sliding with a gasket 3C and a locking arrangement, e.g. two clips 3D, 3E. The galvanic processing device 7 can be pressed in the finish 5 of the bottle 10, removably placed in a tapered seat 5A with the locking arrangement 5B.

Figure 4:
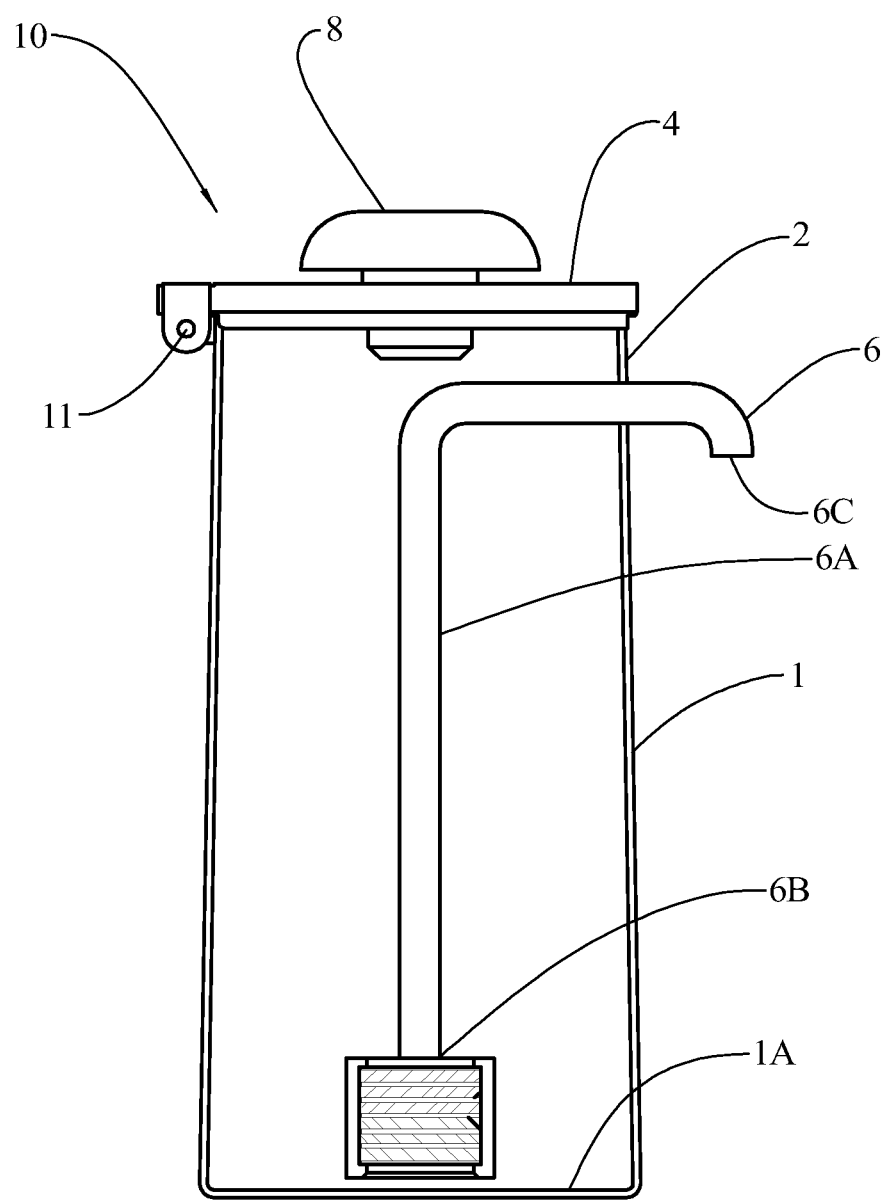
FIG. 4 shows a side sectional view of a fluid container embodying the principles of the present invention in the form of a tap container.

In a sixth embodiment, a tap bottle 10, which may also be thermally insulated, is provided as a fluid container with an output of drinkable activated and vitalized fluids, preferably activated and vitalized water, preferably for water intake, according to this invention, as shown in FIG. 4. The bottle 10 includes a plastic cylindrical hollow body 1 with a wide opening 2 for filling, for example, with a volume of 3.5 liters. The top part of the wide opening 2 is fitted with a liftable cap 4 carried on a hinge pin bearing 11 and fitted with an air pump 8. The outlet 6 is essentially a curved tube 6A that reaches down to a bottom 1A of the body 1 and extends through a wall of the body 1 at a point located below the cap 4. A bottom part 6B of the outlet 6 is fitted with the galvanic processing device 7 for galvanic fluid treatment. Alternatively, the galvanic processing device 7 can be fitted near a top 6C of the outlet tube 6A.

Figure 5:
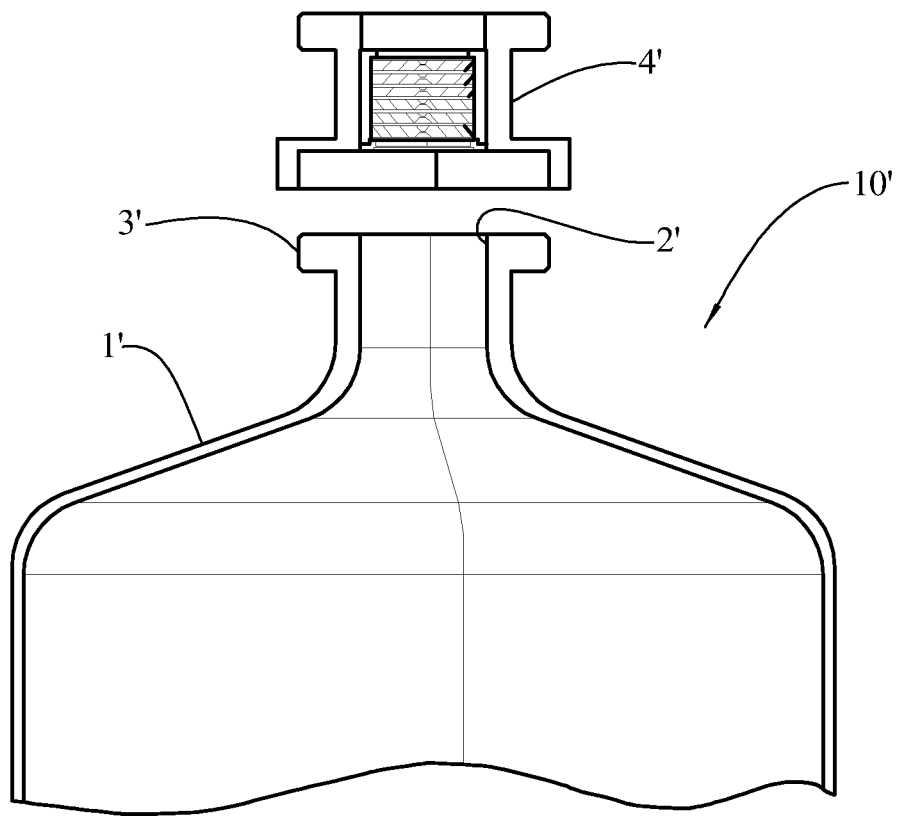
FIG. 5 shows a partial side sectional view of an alternate embodiment of a container, cap and galvanic processing device embodying the principles of the present invention.

A further embodiment of the invention is shown in FIG. 5, in which the bottle 10' comprises a body 1' with a relatively smaller opening 2' (than opening 2 described above) which is closed by a cap 4'. The cap 4' optionally contains the galvanic processing device 7 and may attach to the body 1' at a connector 3' in any of the manners as described above. The cap 4' may also be provided with a closing stopper as discussed with respect to the embodiment of FIG. 1. Other variations as discussed with respect to the different embodiments above may be used with the embodiment of FIG. 5.

Figure 6:
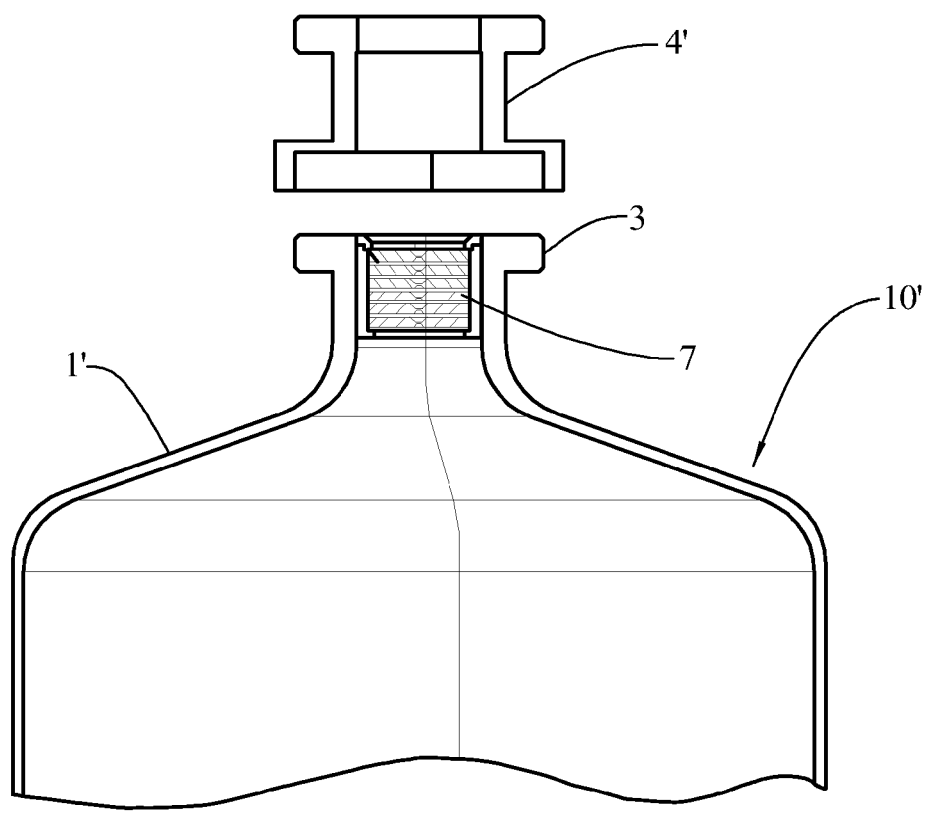
FIG. 6 shows a partial side sectional view of an alternate embodiment of a container, cap and galvanic processing device embodying the principles of the present invention.

A further embodiment of the invention is shown in FIG. 6 which differs from the embodiment of FIG. 5 only in that the galvanic processing device 7 is received in the neck or finish of the bottle 10' rather than in the cap 4'. The galvanic processing device 7 may be held in place by the cap 4' or by some other locking arrangement in the bottle 10'. Again, other variations as discussed with respect to the different embodiments above may be used with the embodiment of FIG. 5.

Figure 7:
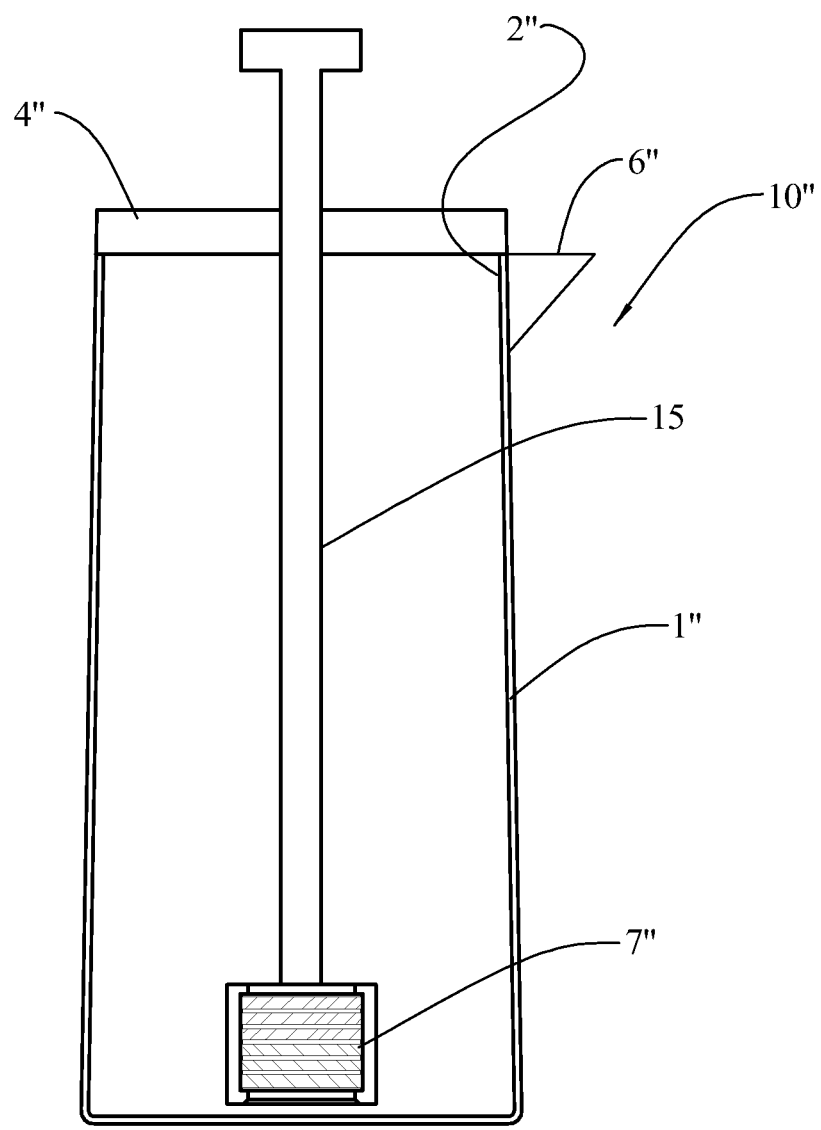
FIG. 7 shows a side sectional schematic view of an alternate embodiment of a container and a galvanic processing device.

A further embodiment of the invention is shown in FIG. 7. As shown in this FIG., there is a fluid container 10" which provides an output of activated and vitalized fluids. The container 10" includes a body 1" having a hollow interior with an opening 2" for filling the hollow interior. An outlet 6" from the hollow body 1" permits fluid in the fluid container 10" to be dispensed from the fluid container. A cap 4" closes the body 1". A galvanic processing device 7" is positioned in the container 10" to provide galvanic treatment of the fluid being dispensed from the fluid container. The galvanic processing device 7" is carried on a rotatable member 15 to be rotatably moved within the hollow body F. The rotatable member 15 may be manually rotated by a user, or may be rotated by a motor (not shown) so that the electrodes 7D, 7E of the galvanic processing device 7" will be subjected to a flow of fluid thereover to provide galvanic treatment to the fluid in the container 10".

While particular embodiments of the container for activation of drinkable fluids have been shown and described, it will be appreciated by those skilled in the art that changes and modifications may be made thereto without departing from the invention in its broader aspects and as set forth in the following claims.

What is claimed is:

1. A fluid container with an output of drinkable activated and energized fluids, comprising:
   a hollow body with an opening for filling fitted with a connector,
   an openable cap connected to the hollow body at the connector,
   an outlet to permit fluid in the fluid container to be dispensed from the fluid container,
   a galvanic processing device positioned in a stationary manner with respect to the container, said galvanic processing device being located between the hollow body and the outlet to provide galvanic treatment of the fluid being dispensed from the fluid container and to produce a swirling motion of the fluid,
   wherein said swirling motion of the fluid comprises one of the following: levorotatory flow followed by dextrorotatory flow or dextrorotatory flow following by levorotatory flow, and
   wherein the galvanic processing device comprises a series of disks that are segmentially cut, and
   further wherein said disks are separated from each other via spacers provided between adjacent disks at outer peripheries thereof, with said disks and said spacers being maintained in position via a flow unit, whereby said disks lack central mounting apertures.

2. The fluid container according to claim 1, wherein the outlet is provided at the cap and is fitted with a stopper.

3. A fluid container according to claim 1, wherein the cap is fitted with an air pump.

4. The fluid container according to claim 1, wherein the connector connecting the hollow body with the cap is threaded and equipped with a gasket.

5. The fluid container according to claim 1, wherein the connector connecting the hollow body with the cap is sliding and comprises a fitting on the body and a complementary fitting on the cap.

6. The fluid container according to claim 1, wherein the galvanic processing device for galvanic fluid treatment is located in the cap and is either pressed or sealed tightly to the cap.

7. The fluid container according to claim 1, wherein the galvanic processing device for galvanic fluid treatment is cone-shaped and is located in the cap by means of being removably placed in a tapered seat with a locking arrangement.

8. The fluid container according to claim 1, wherein the hollow body and the cap comprise a bottle, and further wherein said hollow body is generally cylindrical and is of a first outer diameter and at least a portion of said cap is of said first outer diameter.

9. The fluid container according to claim 1, wherein the hollow body is equipped with thermal insulation and the cap is equipped with thermal insulation and together comprise a thermally insulated flask.

10. A fluid container according to claim 3, wherein the hollow body and the cap fitted with an air pump comprise a tap container.

11. A fluid container according to claim 3, wherein the hollow body is equipped with thermal insulation and the cap fitted with an air pump is equipped with thermal insulation comprise a thermally insulated tap container.

12. A fluid container according to claim 3, wherein the outlet includes a pipe extending through a wall of the container.

13. A fluid container according to claim 12, wherein the galvanic processing device is secured to the pipe.

14. A fluid container with an output of activated and energized fluids, comprising:
   a body having a hollow interior with an opening for filling the hollow interior,
   an outlet to permit fluid in the fluid container to be dispensed from the fluid container,
   a galvanic processing device positioned in the container to provide galvanic treatment of the fluid being dispensed from the fluid container and to produce a swirling motion of the fluid, whereby the fluid being dispensed is drinkable by humans without further processing, wherein said swirling motion of the fluid comprises one of the following: levorotatory flow followed by dextrorotatory flow or dextrorotatory flow following by levorotatory flow, and wherein the galvanic processing device comprises a series of disks that are segmentally cut and that lack central apertures.

15. The fluid container according to claim 14, wherein the galvanic processing device is positioned in the container and is held in place by a cap.

16. The fluid container according to claim 14, further comprising a cap fitted to the container at the opening.

17. The fluid container according to claim 14, wherein the galvanic processing device comprises a series of disks of two different conductive materials that are held apart by annular, non-conductive, dielectric spacers, and further wherein the galvanic device is positioned in a stationary manner with respect to said cap.

18. The fluid container according to claim 17, wherein the galvanic processing device is housed within a cylindrical flow unit, which is made of a non-conductive, dielectric material, whereby said disks of two different materials are maintained out of conductive contact with each other by a combination of said flow unit and said spacers.

19. A fluid container with an output of activated and energized fluids, comprising:

a body having a hollow interior with an opening for filling the hollow interior, an outlet to permit fluid in the fluid container to be dispensed from the fluid container, a galvanic processing device positioned in the container to provide galvanic treatment of the fluid being dispensed from the fluid container and to produce a swirling motion of the fluid, whereby the fluid being dispensed is drinkable by humans without further processing, wherein the galvanic processing device comprises a series of disks, and wherein said swirling motion of the fluid produced by each of said disks comprises one of the following: levorotatory flow at a center of the galvanic processing device and dextrorotatory flow at a periphery of the galvanic processing device or dextrorotatory flow at the center and levorotatory flow at the periphery.

20. The fluid container according to claim 19, wherein:

the disks are segmentally cut around their circumferences and held apart by annular, non-conductive, dielectric spacers, and the galvanic processing device is housed within a cylindrical flow unit, which is made of a non-conductive, dielectric material, whereby said disks of different materials are maintained out of conductive contact with each other by a combination of said flow unit and said spacers.

* * * * *